Feb. 16, 1937.    F. SPATZ    2,070,758
MOTOR VEHICLE
Filed March 3, 1934
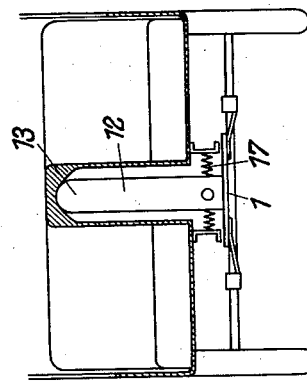
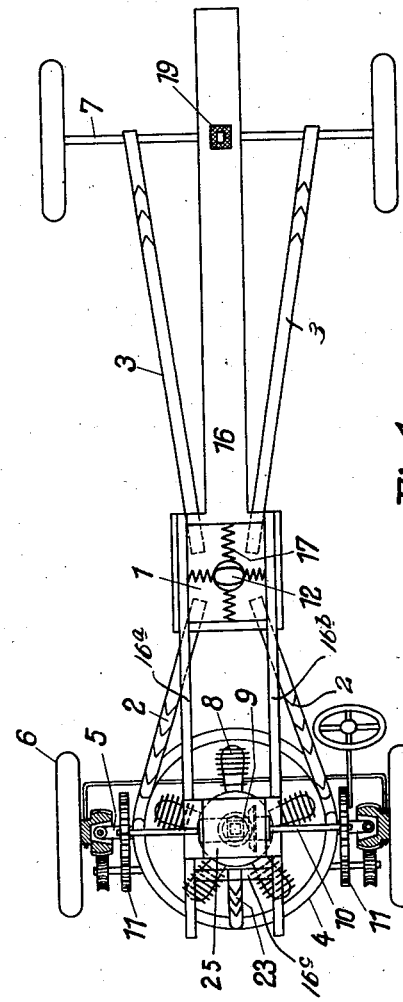
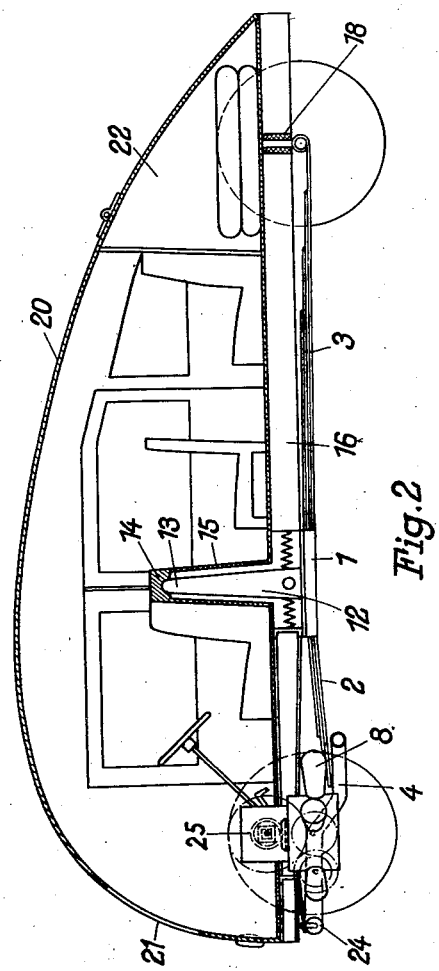
Inventor:

UNITED STATES PATENT OFFICE 2,070,758

MOTOR VEHICLE

Fritz Spatz, Haus Freyimfelde, near Halle on the Saale, Germany

Application March 3, 1934, Serial No. 713,787
In Germany June 17, 1933

6 Claims. (Cl. 180—1)

The invention relates to the construction of a motor vehicle, in which the body is guttiform. Hitherto it was difficult in motor vehicles to obtain sufficient space within the flow line form if, as was customary, the engine is arranged vertical because in the flow line shape particularly the space in the foremost sharply upwardly curved portion is occupied by the engine and is therefore not available for other purposes, whereas the flow line descends relatively suddenly towards the rear, so that the rear space does not afford sufficient space for the passengers.

According to the invention, in order that the engine occupies as little space as possible in height, the axle is made in ring-shape and the engine accommodated within this ring. If a horizontal engine with radial cylinders is employed, this will project only very slightly above the ring-shaped axle so that almost the entire constructional height of the engine is saved. By lowering the position of the engine, the running characteristics of the vehicle are considerably improved and space is saved above the engine and can be utilized for accommodating the driver since it allows ample room for his legs.

The connection of the axles with the frame is effected by two pairs of diverging springs, which springs extending from a butt strap on the frame are attached to the axles.

In order to improve the running characteristics of the vehicle the frame must be supported so that it possesses the greatest possible inertia and remains, as far as possible, in its position also if the vehicle is subjected to jolts. At the same time the body must not incline considerably in outward direction when the vehicle is negotiating curves.

Therefore, according to the invention, the carriage body is supported at a point situated above its centre of gravity plane, so that no strong moments in horizontal or in vertical direction can occur, which would bring the body out of its equilibrium position. This may be effected by fitting on the butt strap to which the springs are attached an upright, the upper supporting surface of which lies above the centre of gravity plane of the body. In order to prevent horizontal oscillations, damping devices, such as springs or elastic bodies, are provided between the upright and the frame.

An embodiment of the invention is illustrated by way of example in the accompanying drawing in which:—

Fig. 1 shows the under portion of a motor vehicle in top plan view.

Fig. 2 is a longitudinal section through the vehicle and

Fig. 3 is a cross section of Fig. 2.

Two pairs of diverging springs 2 and 3 extend in opposite directions from a butt strap 1. The front ends of springs 2 rest on a ring-shaped axle 4 consisting of a welded length of tube bent in circular shape. Axle journals 5 around which the front wheels 6 rotate, are mounted on this ring-shaped axle. The front portion of the ring-shaped axle 4 situated in a higher plane than the rear portion of the axle is connected with a transverse bar 16c between the arms 16a and 16b of the forked front part of frame 16 by means of a spring 23, the bent front end of which engages over a bolt joint 24 of the ring-shaped axle 4. The fork-shaped front part of frame 16 rests upon the butt strap 1.

The rear axle 7, which may be made in one piece, is connected with the rear ends of the diverging springs 3.

The driving engine lies within the ring-shaped axle 4, and its cylinders 8 are arranged for example horizontally and radially. The vertical driving shaft carries a horizontal bevel wheel 9, which meshes with a vertical bevel wheel on a shaft 10 which drives the front wheels through the intermediary of transmission wheels 11.

The engine may be arranged in a similar manner on the rear axle.

A gear case 25 covers the engine and is connected, same as the engine, with the arms 16a, 16b of the forked front portion of frame 16.

On the butt strap 1 an upright 12 is mounted at the middle approximately in the centre of gravity plane of the vehicle. This upright has a domed upper surface 13 which forms the supporting surface for the body.

A sleeve 15 formed by an upwardly bent portion of the bottom plate of the body 20 terminates at the top in a supporting piece 14 which rests on the domed top end 13 of the upright 12. Springs 17 connect the upright 12 with the frame 16, the frame arms 16a, 16b and the front end of the butt strap 1.

A guide pin 18 of the rear axle 7 engages in a recess in frame 16, an elastic lining 19 made of rubber or the like being interposed between these two parts.

The sleeve 15 on the supporting upright 12 is fitted in the vehicle so that it is as inconspicuous as possible; for example it forms a part of the back of the front seat.

The carriage body 20 is guttiform and has at its front end a window 21, through which the driver has a very clear view, because it is not obstructed by an engine bonnet.

The space 22 tapering to a point on the rear end of the body serves as luggage compartment and for accommodating spare wheels. The space in the body is therefore very advantageously utilized in this arrangement.

I claim:—

1. A motor vehicle, comprising in combination a ring-shaped front axle, a rear axle, a joint plate intermediate said axles, two pairs of oppositely directed outwardly diverging springs extending from said joint plate and bearing respectively on said front axle and on said rear axle, an upright on said joint plate, a body, a frame carrying said body supported on the upper end of said upright above the centre of gravity of said body, and shock absorbing elements arranged between said upright and said frame and adapted to absorb horizontal oscillations.

2. A motor vehicle, comprising in combination a front axle, a rear axle, a butt-strap intermediate said two axles, two pairs of oppositely directed outwardly diverging springs extending from said butt-strap and bearing respectively on said front axle and on said rear axle, a frame, an upwardly projecting pin on said rear axle, said frame having a recess adapted to engage over said pin, and rubber buffers in said recess between said frame and said pin.

3. A motor vehicle, comprising in combination a ring-shaped front axle, the front portion of which is situated on a higher plane than the rear portion, a rear axle, a butt-strap intermediate said two axles, two pairs of oppositely directed diverging springs extending from said butt-strap and bearing respectively on said front axle and on said rear axle, a frame resting on said butt-strap guided at the rear end on said rear axle and fork-shaped at its front end, a transverse bar between the arms of said fork-shaped part of said frame, a bolt joint on the front portion of said front axle, and a spring fixed at its rear end on said transverse bar and engaging at its front end over said bolt joint.

4. A motor vehicle, comprising in combination a ring-shaped front axle, a rear axle, a butt strap intermediate said axles, two pairs of oppositely directed outwardly diverging springs extending from said butt strap and bearing respectively on said front axle and on said rear axle, a frame resting on said axles and on said butt strap, an upright on said butt strap having a domed upper surface, a carriage body having a sleeve extending upwardly from the base of said body in the back of the driver's seat, a supporting element at the upper end of said sleeve and resting on the upper end of said upright supporting said carriage body above its centre of gravity, and shock absorbing elements interposed between said upright and said frame and adapted to absorb horizontal oscillations.

5. A motor vehicle, comprising in combination a front axle consisting of a horizontal ring, a rear axle, a butt strap intermediate said two axles, two pairs of oppositely directed outwardly diverging springs extending from said butt strap and bearing respectively on said front axle and on said rear axle, a frame resting on said rear axle and butt strap and a fork in its front portion, a transverse bar between the arms of said front portion, stub axles extending from said ring-shaped front axle, a supporting spring for said frame fixed at the rear end to said transverse bar and at the front end to said ring-shaped front axle.

6. A motor vehicle as specified in claim 5, in which an engine carried by said frame is located in the ring-shaped front axle.

FRITZ SPATZ.